US012422571B2

(12) United States Patent
Sedin et al.

(10) Patent No.: US 12,422,571 B2
(45) Date of Patent: Sep. 23, 2025

(54) DEVICE AND METHOD FOR DETERMINING RADON CONCENTRATION

(71) Applicant: RADONOVA LABORATORIES AB, Uppsala (SE)

(72) Inventors: Dag Sedin, Enköping (SE); Christer Fröjdh, Sundsvall (SE); Göran Thungström, Sundsvall (SE)

(73) Assignee: RADONOVA LABORATORIES AB, Uppsala (SE)

( * ) Notice: Subject to any disclaimer, the term of this patent is extended or adjusted under 35 U.S.C. 154(b) by 204 days.

(21) Appl. No.: 18/272,418

(22) PCT Filed: Jan. 17, 2022

(86) PCT No.: PCT/EP2022/050911
§ 371 (c)(1),
(2) Date: Jul. 14, 2023

(87) PCT Pub. No.: WO2022/152909
PCT Pub. Date: Jul. 21, 2022

(65) Prior Publication Data
US 2024/0077625 A1  Mar. 7, 2024

(30) Foreign Application Priority Data
Jan. 18, 2021  (SE) .................................... 2150042-6

(51) Int. Cl.
*G01T 1/178* (2006.01)
*G01T 1/02* (2006.01)
*G01T 1/24* (2006.01)

(52) U.S. Cl.
CPC .............. *G01T 1/178* (2013.01); *G01T 1/026* (2013.01); *G01T 1/24* (2013.01)

(58) Field of Classification Search
CPC ............ G01T 1/178; G01T 1/026; G01T 1/24
See application file for complete search history.

(56) References Cited

U.S. PATENT DOCUMENTS

| 3,968,371 | A | 7/1976 | Greendale |
| 4,700,067 | A | 10/1987 | Carossi et al. |

(Continued)

FOREIGN PATENT DOCUMENTS

| CN | 108614289 A | 10/2018 |
| EP | 2307912 A1 | 4/2011 |

(Continued)

OTHER PUBLICATIONS

Ashokkumar et al., "Development and characterisation of a silicon PIN diode array based highly sensitive portable continuous radon monitor," Journal of Radiological Protection, vol. 34, No. 1, Dec. 13, 2013, pp. 149-160.

(Continued)

*Primary Examiner* — David P Porta
*Assistant Examiner* — Fani Polyzos Boosalis
(74) *Attorney, Agent, or Firm* — MEDLER FERRO WOODHOUSE & MILLS PLLC (57) ABSTRACT

A device for determining radon concentration is provided. The device includes a diffusion chamber, that includes a number of openings that allow radon gas to enter and exit, and a radon sensing arrangement. The radon sensing arrangement includes at least one processing device and one or more detectors, arranged inside the diffusion chamber in such a way that no part of the diffusion chamber is located at a distance, perpendicular to the detector, of more than 20 mm from the closest part of a detector. The at least one processing device is arranged to determine the radon concentration by analyzing and processing the energy spectrum of alpha particles detected by the one or more detectors.

24 Claims, 7 Drawing Sheets

(56) References Cited

U.S. PATENT DOCUMENTS

| | | | |
|---|---|---|---|
| 4,871,914 A | | 10/1989 | Simon et al. |
| 4,920,263 A | | 4/1990 | Fimian et al. |
| 4,975,575 A | * | 12/1990 | Perlman .................. G01T 1/178 |
| | | | 250/DIG. 2 |
| 5,026,986 A | | 6/1991 | Hurst |
| 5,834,628 A | * | 11/1998 | Hunter ..................... G01T 7/04 |
| | | | 250/255 |
| 6,288,400 B1 | | 9/2001 | Negro |
| 8,143,584 B2 | | 3/2012 | Burke et al. |
| 2009/0230305 A1 | | 9/2009 | Burke et al. |

FOREIGN PATENT DOCUMENTS

| | | | | |
|---|---|---|---|---|
| WO | 2010/016085 A1 | | 2/2010 | |
| WO | WO-2020130317 A1 | * | 6/2020 | ............. G01T 1/178 |

OTHER PUBLICATIONS

International Search Report and Written Opinion received for PCT Patent Application No. PCT/EP2022/050911, mailed on Apr. 28, 2022, 15 pages.

Irlinger et al., "Thoron detection with an active Radon exposure meter-First results," Review of Sciencetific Instruments, vol. 85, No. 2, Feb. 21, 2014, pp. 022106 (1-5).

SE Office Action Mailed on Jun. 17, 2021 for SE Application No. 2150042, 7 page(s).

SE Office Action Mailed on Nov. 16, 2022 for SE Application No. 2150042, 7 page(s).

\* cited by examiner

DEVICE AND METHOD FOR DETERMINING RADON CONCENTRATION

CROSS-REFERENCE TO PRIOR APPLICATIONS

This application is a § 371 National Stage Application of PCT International Application No. PCT/EP2022/050911 filed Jan. 17, 2022, which claims priority to Swedish Patent Application No. 2150042-6 filed Jan. 18, 2021, each of which are incorporated herein in their entirety.

TECHNICAL FIELD

The present disclosure relates generally to devices and methods for determining radon concentration.

BACKGROUND

Radon is a chemical element that under normal conditions is gaseous and easily inhaled. Radon is therefore a health hazard—it is e.g. one of the leading causes of lung cancer. Radon is often the single largest contributor to an individual's background radiation dose, but due to local differences in geology, the level of exposure to radon differs from place to place. A common source of radon is uranium-containing minerals in the ground. Radon comes in a number of different isotopes, of which $^{222}$Rn is especially dangerous, because its long half-life allows it to permeate soil and rocks. Due to the density of radon, it can especially accumulate in subterranean areas such as e.g. basements or mines.

Personnel working in environments where they may be exposed to radon must carry radon dosimeters in order to determine their level of exposure. Many countries have imposed limits to the amount of radon that a person is allowed to be exposed to in the workplace, e.g. per year. In Sweden, it is mandatory to monitor the radon exposure of employees in all workplaces where the radon level is above 200 Bq/m$^3$, to ensure that the annual radiation dose is not exceeded.

Radon in the form of $^{222}$Rn decays by emission of an alpha particle with an energy of 5.5 MeV. The resultant primary radon decay product $^{218}$Po has a half life of about 3 minutes before emitting an alpha particle of 6.0 MeV. The resultant $^{214}$Pb has a half life of about 27 minutes before beta-decaying to $^{214}$Bi, which in turn has a half life of about 20 minutes and beta-decays to $^{214}$Po. $^{214}$Po has a half life of about 164 microseconds before emitting an alpha particle of 7.7 MeV, resulting in $^{210}$Pb, which has a half life of 22 years, and is thus relatively stable. It is common practice for radon dosimeters to include all the emitted alpha particles during the whole decay process from radon to $^{210}$Pb in the determination of the radon exposure (the beta and gamma particles emitted during the decay have lower energies, and can thus be filtered away relatively easily).

The alpha particles are emitted at a velocity, but are easily stopped. Radon dosimeters generally determine radon concentration in air by detecting the alpha particles emitted at the decay, either passively, using nuclear track detectors, or actively, using semiconductor technology. Passive radon dosimeters can only determine the accumulated radon exposure over time, and must therefore be personal to each worker. Active dosimeters, on the other hand, need a supply of electrical power.

Semiconductor technology may be used for detecting alpha particles due to the fact that an alpha particle hitting a photodiode creates electron-hole pairs which will cause a small current to be generated. These current signals can be detected and counted to provide a measure of the radon concentration within the diffusion chamber. Such active measurements can be provided continuously in time, rather than having to wait for the results of a laboratory analysis.

U.S. Pat. No. 8,143,584 describes an active radon dosimeter, where a PIN photodiode (or other semiconductor-based sensing unit) is placed in a diffusion chamber.

Problems with the Prior Art

In prior art radon dosimeters such as e.g. the one described in U.S. Pat. No. 8,143,584, decay of secondary radon decay products such as e.g. $^{214}$Po is included in the detection, which makes it necessary to wait for an equilibrium between the radon gas and the secondary radon decay products in order to make an accurate determination of the radon concentration (the term "secondary radon decay product" in this disclosure refers to all decay products from all decays after the primary radon decay, and thus includes also $^{214}$Po). This means that prior art radon dosimeters often do not provide actual real-time determinations of the radon concentration.

There is thus a need for an improved radon dosimeter.

SUMMARY

The above described problem is addressed by the claimed device for determining radon concentration. The claimed device preferably comprises a diffusion chamber, that comprises a number of openings that allow radon gas to enter and exit, and a radon sensing arrangement. The radon sensing arrangement may comprise at least one processing device and one or more detectors, arranged inside the diffusion chamber in such a way that no part of the diffusion chamber is located at a distance, perpendicular to the detector, of more than 20 mm from the closest part of a detector. The at least one processing device is preferably arranged to determine the radon concentration by analyzing and processing the energy spectrum of alpha particles detected by the one or more detectors. This enables actual real-time determination of the radon concentration, by designing the device for optimizing the detection of direct radon gas decay.

In embodiments, the diffusion chamber is an enclosed volume that is created by a frame, in the shape of four side walls, and two lids, arranged on either side of the frame, and the one or more detectors are arranged on at least one of the lids. In embodiments, the one or more detectors are arranged on both lids. In embodiments, the distance between the lids is less than 20 mm, preferably 5-15 mm, even more preferably 8-12 mm. This ensures that the distance between the radon gas molecules and the one or more detectors is small enough for the energy loss of the alpha particles, before they reach the detector, to be low.

In embodiments, interior wall segments are arranged inside the diffusion chamber, in order to limit the number of alpha particles hitting a detector after travelling a long distance (such as e.g. more than 20 mm, more than 15 mm, or more than 12 mm) sideways inside the diffusion chamber. This makes it easier to accurately remove the effects of secondary radon decay products such as e.g. $^{214}$Po.

In embodiments, at least some of the openings are covered with a physical filter that prevents radon decay products from entering the diffusion chamber. This prevents such radon decay products from affecting the determination of the radon concentration.

In embodiments, the device comprises a moisture shield that prevents moisture from entering the diffusion chamber. This protects the contents of the diffusion chamber from being affected by such moisture.

In embodiments, the device comprises means for alerting the user when radon concentration beyond a predetermined threshold has been detected.

In embodiments, the at least one processing device is arranged to record a time stamp for each detected alpha particle. This enables a better analyzing and processing of the energy spectrum.

In embodiments, the at least one processing device is arranged to subtract the contribution to the energy spectrum from decays taking place on surfaces that are not detectors, before determining the radon concentration. Recorded time stamps for the detected alpha particles may be used to improve such a subtraction.

In embodiments, the at least one processing device is arranged to use an energy window, in the form of an upper and a lower energy threshold, to filter away the contribution from alpha particles from decay of secondary radon decay products, before determining the radon concentration. This increases the accuracy of the determination of the radon concentration.

In embodiments, the at least one processing device is arranged to include detected decays from both radon gas and its primary decay product in the determination of radon concentration. This increases the accuracy of the determination of the radon concentration.

The above described problem is further addressed by the claimed method for determining radon concentration using a device comprising a diffusion chamber that comprises a number of openings that allow radon gas to enter and exit, and a radon sensing arrangement comprising one or more detectors that are arranged inside the diffusion chamber in such a way that no part of the diffusion chamber is located at a distance, perpendicular to the detector, of more than 20 mm from the closest part of a detector. The method may comprise determining the energy content of alpha particles detected by the one or more detectors, and determining the radon concentration by analyzing and processing the energy spectrum of these alpha particles. This enables actual real-time determination of the radon concentration, by designing the device for optimizing the detection of direct radon gas decay.

In embodiments, the method comprises preventing radon decay products from entering the diffusion chamber by covering at least some of the openings with a physical filter. This prevents such radon decay products from affecting the determination of the radon concentration.

In embodiments, the method comprises preventing moisture from entering the diffusion chamber by using a moisture shield. This protects the contents of the diffusion chamber from being affected by such moisture.

In embodiments, the method comprises recording a time stamp for each detected alpha particle. This enables a better analyzing and processing of the energy spectrum.

In embodiments, the method comprises subtracting the contribution to the energy spectrum from decays taking place on surfaces that are not detectors, before determining the radon concentration. Recorded time stamps for the detected alpha particles may be used to improve such a subtraction.

In embodiments, the method comprises filtering away the contribution from alpha particles from decay of secondary radon decay products, by using an energy window, in the form of an upper and a lower energy threshold. This increases the accuracy of the determination of the radon concentration.

In embodiments, the method comprises including detected decays from both radon gas and its primary decay product in the determination of radon concentration.

In embodiments, the method comprises alerting the user when radon concentration beyond a predetermined threshold has been detected.

In embodiments, the method comprises arranging interior wall segments inside the diffusion chamber, in order to limit the number of alpha particles hitting a detector after travelling a long distance (such as e.g. more than 20 mm, more than 15 mm, or more than 12 mm) sideways inside the diffusion chamber. This makes it easier to accurately remove the effects of secondary radon decay products such as e.g. $^{214}$Po.

The detectors may e.g. be semiconductor detectors, such as e.g. diode arrays.

The device may e.g. be a radon dosimeter.

The term "secondary radon decay products" in this disclosure refers to all decay products from all decays after the primary radon decay.

The at least one processing device that is comprised in the radon sensing arrangement may be one or more processing devices. Such one or more processing devices are not necessarily all arranged in the device for determining radon concentration. Processing may also, or alternatively, be made by one or more processing devices that are external to the device for determining radon concentration, and with which the device for determining radon concentration communicates.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

A radon dosimeter determines the concentration of radon gas in the air by measuring radioactive decays in a fixed volume, in this disclosure called a diffusion chamber. Most radon dosimeters rely on the collection of radon daughters (radon decay products) in an electrical field, and have low sensitivity to the radon gas itself. Around 82% of the $^{222}$Rn decay products are positively charged when generated and can thus be easily collected on a small detector by applying an electrical field. However, a significant number of ions may be neutralized in a humid atmosphere. For precision measurements, the temperature and the humidity in the diffusion chamber must be monitored, when using an electrical field for collecting the radon decay products.

In prior art radon dosimeters, decay of secondary radon decay products such as e.g. $^{214}$Po is included in the determination, which makes it necessary to wait for an equilibrium between the radon gas and the secondary radon decay products in order to make an accurate determination of the radon concentration. This means that prior art radon dosimeters often do not provide actual real-time determinations of the radon concentration.

Figure 5A:
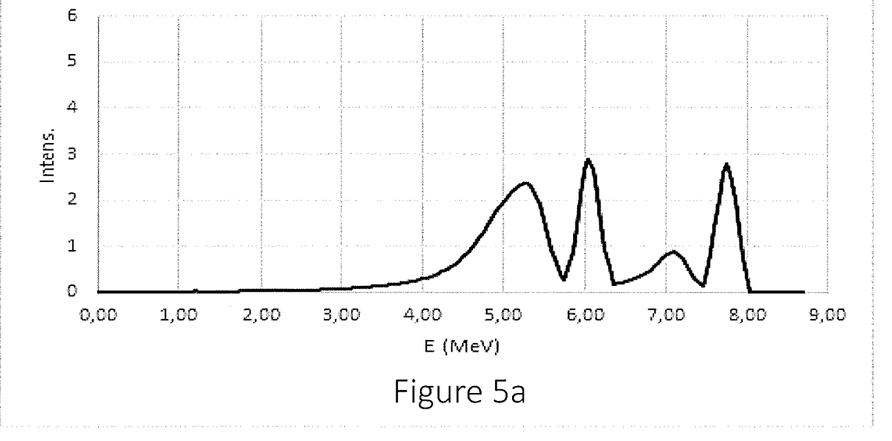
FIGS. 5a-c illustrate how the energy distribution of alpha particles hitting a detector is affected by the maximum distance from the decay point to the detector.
Figure 5B:
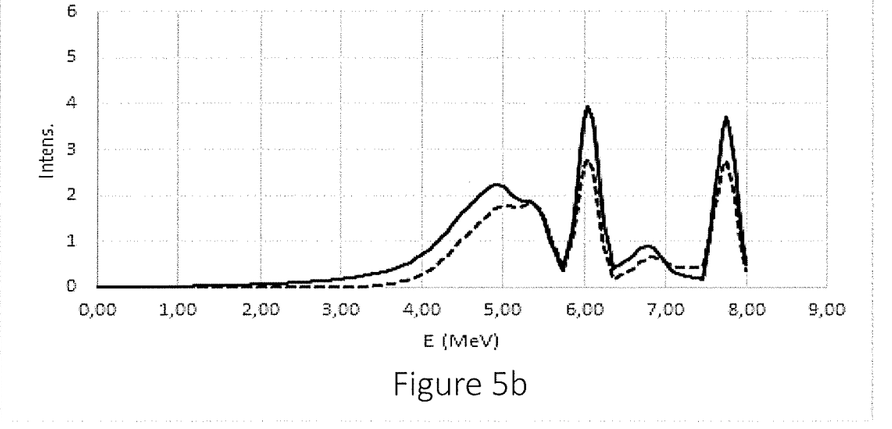
Figure 5C:
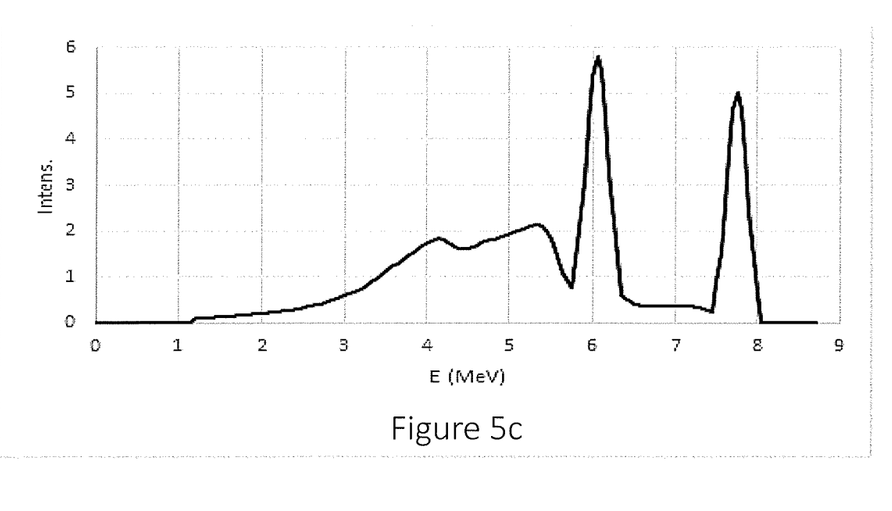

Since the decay energy of the secondary radon decay product $^{214}$Po (7.7 MeV) is much higher than the decay energy of $^{222}$Rn (5.5 MeV) and of the primary radon decay product $^{218}$Po (6.0 MeV), it is possible to filter away the contribution from the decay of the secondary radon decay products, so that this contribution does not affect the determination of the radon concentration. However, an alpha particle loses energy every time it collides with another particle. Measurements have shown that the energy of an alpha particle decreases with about 1 MeV for each 10 mm of movement in air from the decay point. This effect is shown in FIGS. 5a-c, which illustrate how the energy distribution of alpha particles hitting a detector is affected by the maximum distance from the decay point to the detector (which corresponds to the height of the diffusion chamber). FIG. 5a shows the energy distribution for a diffusion chamber that is 8 mm high, the solid line in FIG. 5b shows the energy distribution for a diffusion chamber that is 12 mm high, and FIG. 5c shows the energy distribution for a diffusion chamber that is 20 mm high. Increased height of the diffusion chamber makes it more difficult to accurately filter away the contribution from only the decay of the secondary radon decay products, so that this contribution does not affect the determination of the concentration of radon gas. A height of 20 mm is the upper limit for achieving that at least 50% of the detected alpha particles are emitted from direct decay of radon gas.

As illustrated in FIGS. 5a-c, if the diffusion chamber is too high, it may no longer be possible to distinguish the different types of decay from each other, because of the decrease in alpha particle energy before the detector is reached. At the same time, since radioactive decay follows the Poisson distribution, the measurement accuracy will be determined by the number of decays that are recorded during a certain time interval. This limits how small the diffusion chamber may be made while still maintaining a high enough measurement accuracy. If the device is a dosimeter, it must however be small enough to carry e.g. in a breast pocket.

The size of the diffusion chamber must thus be optimized based on all these parameters, in order to optimize the detection of direct radon gas decay. Preferably, at least 50% of the detected alpha particles are emitted from direct decay of radon gas. However, by including detected decays from both radon gas (e.g. $^{222}$Rn) and its primary decay product (e.g. $^{218}$Po), the number of detected decays per time unit will be almost twice as high as if only direct decay of radon gas would be detected. This increases the measurement accuracy, and thus allows the diffusion chamber to be made smaller.

This disclosure describes a device for determining radon concentration, e.g. a radon dosimeter, that uses one or more semiconductor detectors to determine the concentration of radon gas through detection of the decay of radon gas molecules in a diffusion chamber that is arranged so that the distance between the radon gas molecules and the one or more semiconductor detectors is small enough for the energy loss of the alpha particles, before they reach the detector, to be low. This enables the filtering away of the contribution from alpha particles from decay of secondary radon decay products such as e.g. $^{214}$Po, which means that the device continuously and accurately determines the radon gas concentration in air in real time. This enables a user to be alerted if the real time radon concentration is above a predetermined threshold, such as e.g. 500 Bq/m$^3$.

The device is arranged to allow diffusion of gas between the surrounding air and the diffusion chamber, so that the concentration of radon gas in the diffusion chamber will accurately correspond to the concentration of radon gas in the surrounding air. The device is preferably arranged with a physical filter, e.g. made of textile, that prevents diffusion of radon decay products from the surrounding air into the diffusion chamber. The device may be used for e.g. $^{222}$Rn, $^{220}$Rn and/or $^{219}$Rn.

The present disclosure relates generally to devices and methods for determining radon concentration. Embodiments of the disclosed solution are presented in more detail in connection with the figures.

Figure 1A:
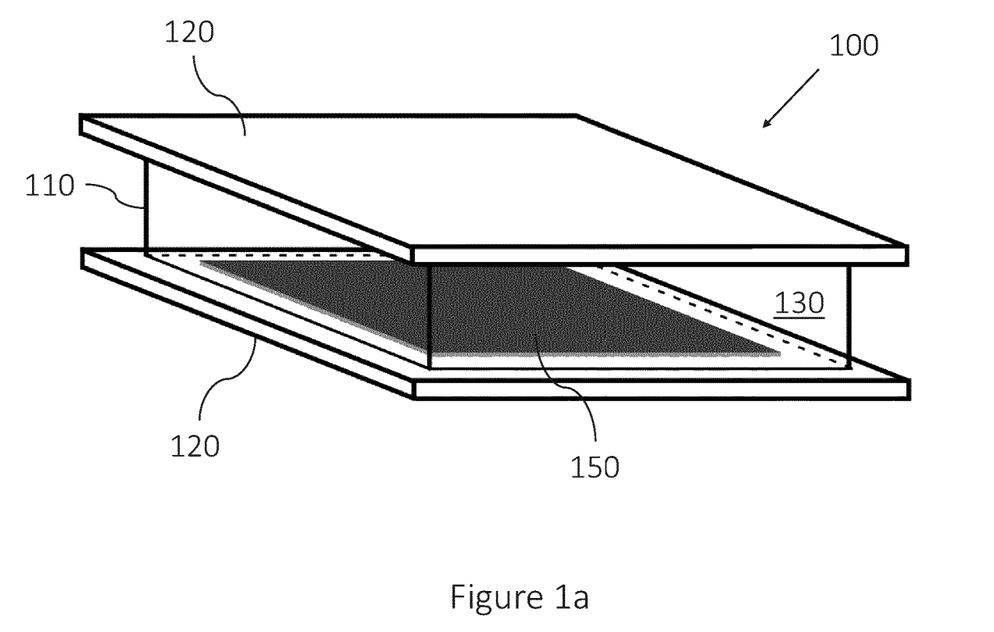
FIGS. 1a-b schematically illustrate an example embodiment of a radon dosimeter, in accordance with one or more embodiments described herein.
Figure 1B:
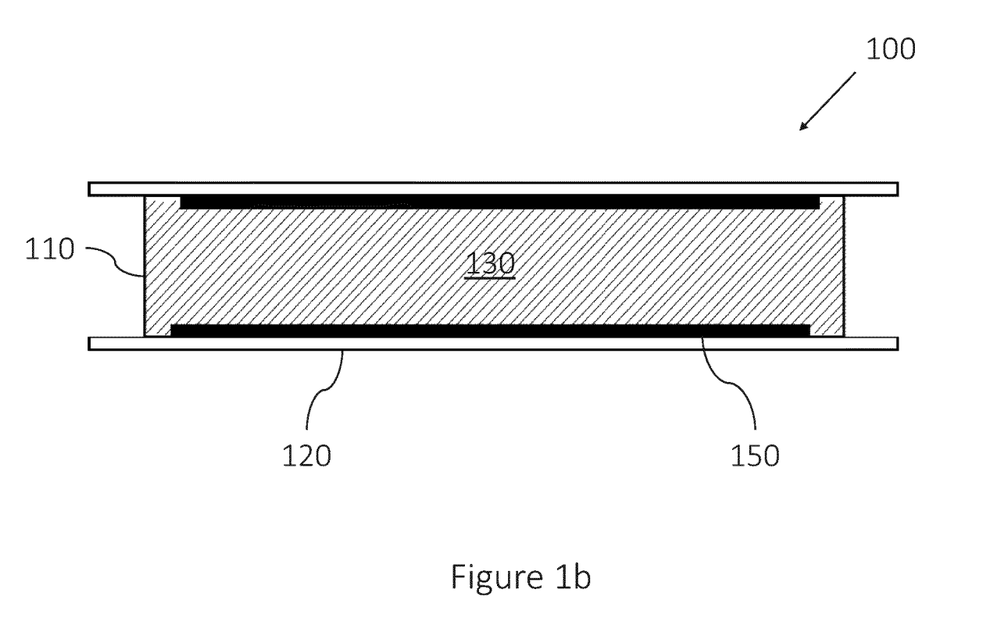

FIGS. 1a-b schematically illustrate an example embodiment of a device for determining radon concentration in the form of a radon dosimeter 100. The radon dosimeter 100 comprises a frame 110 in the shape of four side walls, e.g. made of metal, on which lids 120 are arranged on either side, creating an enclosed volume in the form of a diffusion chamber 130. The lids 120 may e.g. comprise circuit boards. A radon sensing arrangement 150 is arranged on at least one of the lids 120. In the radon dosimeter 100 illustrated in FIG. 1a-b, the schematically illustrated radon sensing arrangement 150 is arranged on both lids 120.

Figure 2A:
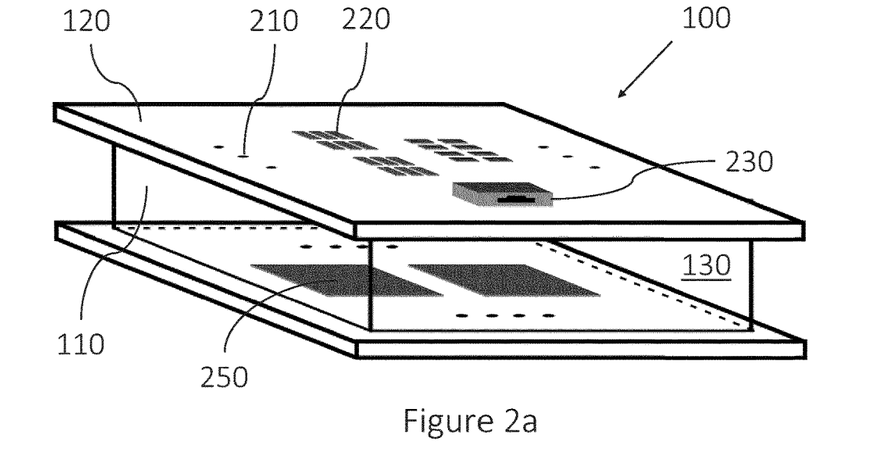
FIGS. 2a-c schematically illustrate example embodiments of radon dosimeters, in accordance with one or more embodiments described herein.
Figure 2B:
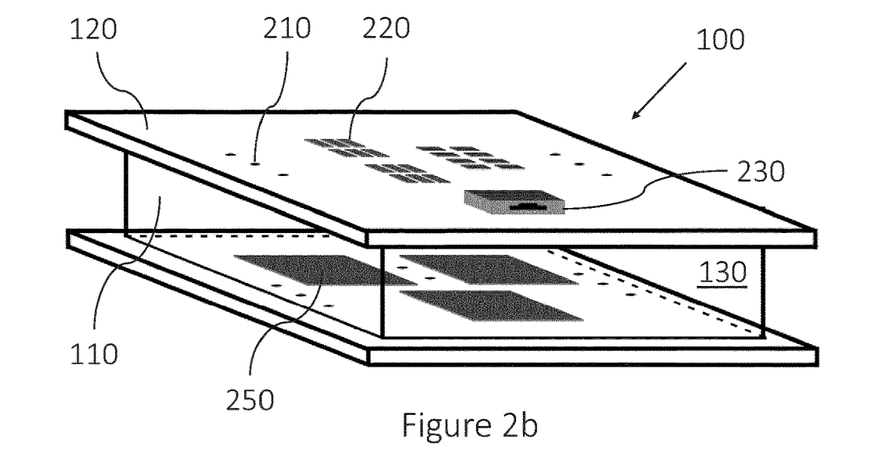
Figure 2C:
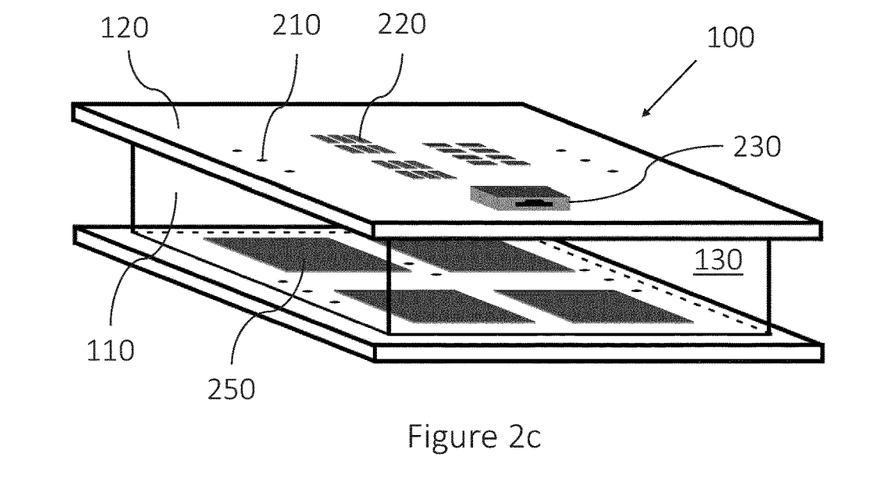

FIGS. 2a-c schematically illustrate that the radon sensing arrangement 150 may comprise any number of detectors 250 that are arranged in any type of configuration. The detectors 250 are preferably semiconductor detectors, such as e.g. diode arrays. The detectors 250 do not have to cover the whole surface area of the lids 120, but any part of the diffusion chamber 130 that extends far beyond the surface covered by detectors 250 will not give any significant contribution to the measurements. The measurement accuracy is thus not increased if the size of the diffusion chamber 130 is increased without increasing the surface area of the detectors 150.

The radon sensing arrangement 150 further comprises control electronics 220, including at least one processor, e.g. a microprocessor. The control electronics 220 is preferably arranged outside of the diffusion chamber 130, e.g. on the outside of at least one of the lids 120. The radon dosimeter 100 may also comprise communication means 230, that enable it to communicate with another unit. Such communication means 230 may e.g. be in the form of a connector that is integrated into the circuit board, in the form of a cord, or in the form of wireless communication means. The at least one processor is not necessarily arranged in the radon dosimeter 100. Processing may also, or alternatively, be made by one or more processors that are external to the radon dosimeter 100, and with which the radon dosimeter 100 communicates using the communication means 230.

As illustrated in FIGS. 2a-c, the radon dosimeter 100 comprises openings 210 so that air containing radon gas can easily diffuse into the diffusion chamber 130. This ensures that there is always an equilibrium between the radon gas concentration in the diffusion chamber 130 and in the surrounding air, which is necessary for the determination of the radon concentration to be accurate. The openings 210 may e.g. be arranged in at least one of the lids 120, e.g. as openings in the circuit boards. The openings 210 may also, or alternatively, be arranged in the frame 110. FIGS. 2a-c schematically illustrate that there may be any number of openings 210 that may be arranged in any type of pattern around the diffusion chamber 130.

The openings 210 may be covered by physical filters, e.g. HEPA filters made of textile, e.g. HEPA 1 filters (blocking particles larger than 1 μm), that prevent diffusion of radon decay products into the diffusion chamber 130. This prevents such radon decay products from affecting the determination of the radon concentration. Any contamination of the diffusion chamber 130 due to accumulation of long-lived radon decay products in the diffusion chamber 130 may be compensated for by making a background calibration of the radon dosimeter 100 after a period of use.

The radon dosimeter 100 may also comprise a moisture shield that prevents moisture from entering the diffusion chamber 130. This protects the contents of the diffusion chamber 130 from being affected by such moisture. Such a moisture shield may be a separate shield, or a shield that is combined with the physical filters covering the openings 210. The moisture shield may e.g. be made from moisture-repelling textile.

In order to ensure that the maximum distance from all decay points in the diffusion chamber 130 to a detector 250 is short enough to enable different types of decay to be distinguished from each other, the height of the diffusion chamber 130, i.e. the distance between the two lids 120, is preferably a maximum of 20 mm, preferably 5-15 mm, even more preferably 8-12 mm. The device 100 may have any shape, and is not necessarily in the form of four side walls 110 with lids 120 on either side, but regardless of the shape, it is desirable that no part of the diffusion chamber 130 is located at a distance, perpendicular to the detector 250, of more than 20 mm from the closest part of a detector 250, and preferably much less. A distance of 20 mm is the upper limit for achieving that at least 50% of the detected alpha particles are emitted from direct decay of radon gas. Regardless of the shape of the diffusion chamber 130, detectors 250 may in embodiments be arranged on both sides of the diffusion chamber 130.

Figure 6:
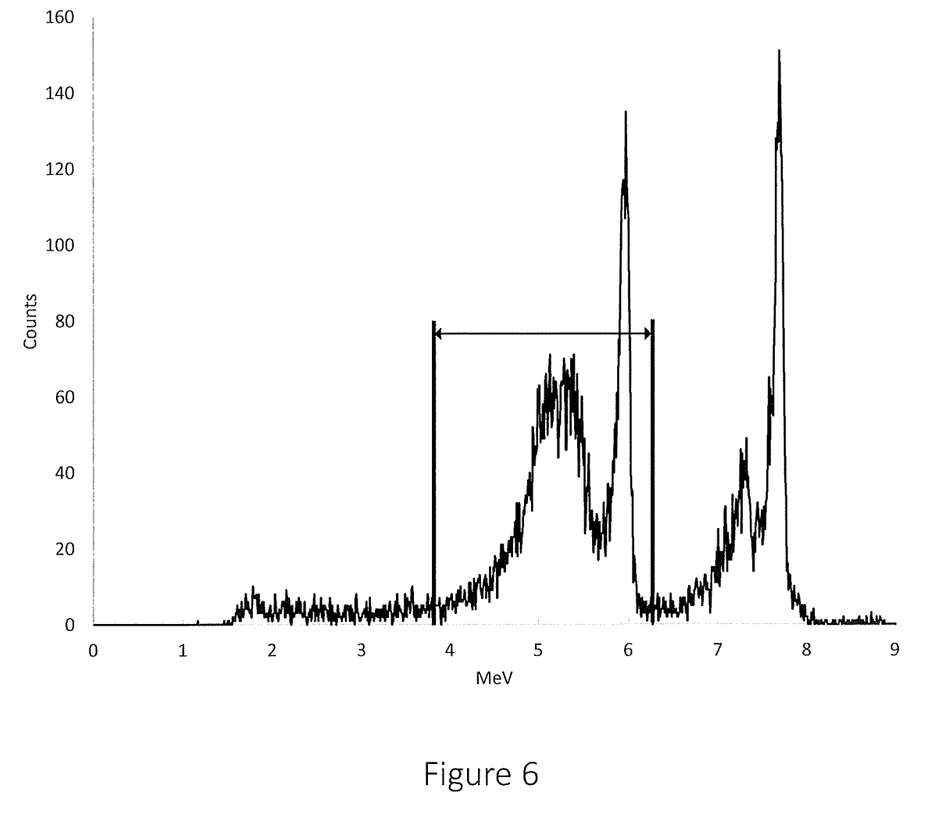
FIG. 6 illustrates the energy distribution of alpha particles hitting a detector.

The radon sensing arrangement 150 preferably determines the radon concentration by analyzing and processing the energy spectrum of alpha particles detected by the one or more detectors 250. This enables the use of an "energy window", in the form of an upper and a lower energy threshold, to filter away the contribution from alpha particles from decay of secondary radon decay products such as e.g. of $^{214}$Po, e.g. using the at least one processor 220. Such an energy window is illustrated in FIG. 6. A suitable energy window enables virtually all the contribution from alpha particles from decay of secondary radon decay products to be filtered away. The lower threshold is preferably between 2 and 4 MeV, preferably between 3 and 4 MeV, and the upper threshold is preferably between 6 and 7 MeV, preferably between 6.2 and 6.7 MeV, as illustrated in FIG. 6.

It is a great advantage for a radon dosimeter to have a rapid response to the radon gas concentration, since workers may move between areas with a low radon gas concentration and areas with a high radon gas concentration. Only measurements where radon gas gives a significant contribution, such as preferably at least 50%, will fulfil this requirement. Measurement accuracy will be increased if contributions from $^{218}$Po are included. Contributions from $^{214}$Po decaying in the chamber can be filtered away by applying an energy window as long as the lowest energy of $^{214}$Po decays hitting the detector is above the energy of $^{218}$Po decays. Minor contributions from $^{214}$Po with energies in the energy window can be removed by subtraction. However, if the concentration of $^{214}$Po is high, as when the device is transferred from a location with high radon concentration to a location with low radon concentration, the uncertainty in such a subtraction will be significant.

As illustrated in FIGS. 5a-c, increased height of the diffusion chamber makes it more difficult to accurately filter away the contribution from only the decay of the secondary radon decay products, so that this contribution does not affect the determination of the concentration of radon gas. The statistical error of the measurements is decreased if most of the alpha particles from decay of secondary radon decay products such as e.g. $^{214}$Po have an energy level that lies outside the selected energy window. This is only the case if no decays take place more than 20 mm, as seen perpendicular to the detector 250, from the closest part of a detector 250. A distance of 20 mm is the upper limit for achieving that at least 50% of the detected alpha particles are emitted from direct decay of radon gas.

The disclosed device 100 for determining radon concentration may thus comprise a diffusion chamber 130 that comprises a number of openings 210 that allow radon gas to enter and exit, and a radon sensing arrangement 150. The radon sensing arrangement 150 may comprise at least one processing device 220 and one or more detectors 250, arranged inside the diffusion chamber 130 in such a way that no part of the diffusion chamber 130 is located at a distance, perpendicular to the detector 250, of more than 20 mm from the closest part of a detector 250. A distance of 20 mm is the upper limit for achieving that at least 50% of the detected alpha particles are emitted from direct decay of radon gas. The at least one processing device 220 may be arranged to determine the radon concentration by analyzing and processing the energy spectrum of alpha particles detected by the one or more detectors 250.

The point in time at which each alpha particle is detected by a detector 250 may be recorded as a time stamp for this particular decay, e.g. by the at least one processor 220. This enables an even more accurate analysis and processing of the energy spectrum. By selecting an integration time period, an energy spectrum for all decays that are detected within this integration time period may be created and analyzed. The recording of time stamps enables the integration time period to be flexible, instead of fixed in advance. Based on the time stamps recorded for the decays, it is always possible to create an energy spectrum for all detected decays having time stamps within any selected integration time period. This enables an analysis of how the radon concentration changes over time, by dynamically determining the gradient of the radon concentration for any selected integration time period, in order to e.g. determine sudden rapid increases in radon concentration. This also enables a more accurate determination of the radon exposure as the radon dose per unit of time (e.g. per year).

The radon gas is not electrically charged, but the decay products generally are, and will therefore normally stick to the first surface they reach. Decay of a radon decay product will therefore normally take place when the radon decay product is located on a surface. At an alpha decay, the particle is emitted in any direction. If the decay occurs on a detector 250, and is detected by the same detector 250, the detected energy will be high, but if the decay takes place on another surface in the diffusion chamber 130, the energy detected by the detector 250 will be much lower. This effect is illustrated in FIG. 5*a*, where there is an energy response at about 7 MeV that corresponds to the decay of the secondary decay product $^{214}$Po on a surface opposite to the detector 250, which may e.g. be another detector 250 (the term "secondary radon decay product" in this disclosure refers to all decay products from all decays after the primary radon decay, and thus includes also $^{214}$Po).

By analyzing the energy spectrum, optionally together with the time stamps of the decay, it is possible to separate the contribution from decays of secondary decay products (e.g. $^{214}$Po), by using the time stamps of the decays and/or an energy window. The at least one processing device 220 may use the time stamps to dynamically determine the gradient of the radon concentration, without using any predetermined integration time period. The at least one processing device 220 may be arranged to also subtract the contribution to the energy spectrum from secondary decay products decaying on surfaces that are not the detectors 250 where the decay is detected, which when they reach a detector 250 have energies lying inside the selected energy window. Recorded time stamps for the detected alpha particles may be used to improve such a subtraction. This enables a more accurate determination of the radon concentration, by taking account also of the decay of radon gas itself and the primary decay product (e.g. $^{218}$Po), without interference from secondary decay products (e.g. $^{214}$Po).

By analyzing the energy spectrum, optionally together with the time stamps of the decay, it may also be possible to automatically determine an optimal energy window for filtering away the contribution from secondary radon decay products such as e.g. of $^{214}$Po, e.g. using the at least one processor 220.

Since it is possible with the disclosed radon dosimeter 100 to accurately filter away the contribution from secondary radon decay products such as e.g. of $^{214}$Po, there is no need to wait for an equilibrium between the radon gas and the secondary radon decay products in order to make an accurate determination of radon concentration. The disclosed radon dosimeter 100 is thus able to continuously and accurately determine the concentration of radon gas in the air.

As explained above, radon decay products such as $^{214}$Po are generally electrically charged and will normally stick to the first surface they reach. Decay of secondary radon decay products such as $^{214}$Po will therefore normally take place when $^{214}$Po is located on a surface, emitting an alpha particle in any direction. Alpha particles that travel sideways through the diffusion chamber 130 (such as e.g. if the surface is one of the side walls 110 or a detector 250 on the opposite side of the diffusion chamber 130) may travel a long distance before hitting a detector 250. This means that such alpha particles often have an energy content that is much lower than 7.7 MeV, due to them moving a longer distance before reaching the detector 250. This makes it difficult to accurately remove the effects of secondary radon decay products such as e.g. $^{214}$Po, since the energy content of such alpha particles often fall into the same energy window as the energy content of alpha particles from decay of radon or primary radon decay products such as $^{218}$Po.

One way of mitigating this problem is to arrange interior wall segments 310 inside the diffusion chamber 130, as illustrated by FIGS. 3*a*-*b* and 4*a*-*b*, in order to limit the number of alpha particles hitting a detector 250 after travelling a long distance (such as e.g. more than 20 mm, more than 15 mm, or more than 12 mm) sideways inside the diffusion chamber 130. The dashed line in FIG. 5*b* illustrates the effect of arranging such interior wall segments 310 in a diffusion chamber 130 that is 12 mm high. As seen in FIG. 5*b*, the use of interior wall segments 310 removes some of the contribution from secondary radon decay products such as $^{214}$Po within the relevant energy window. The interior wall segments 310 are preferably thin, in order not to affect the detection of decay of radon or primary radon decay products such as $^{218}$Po to any greater extent.

Figure 3A:
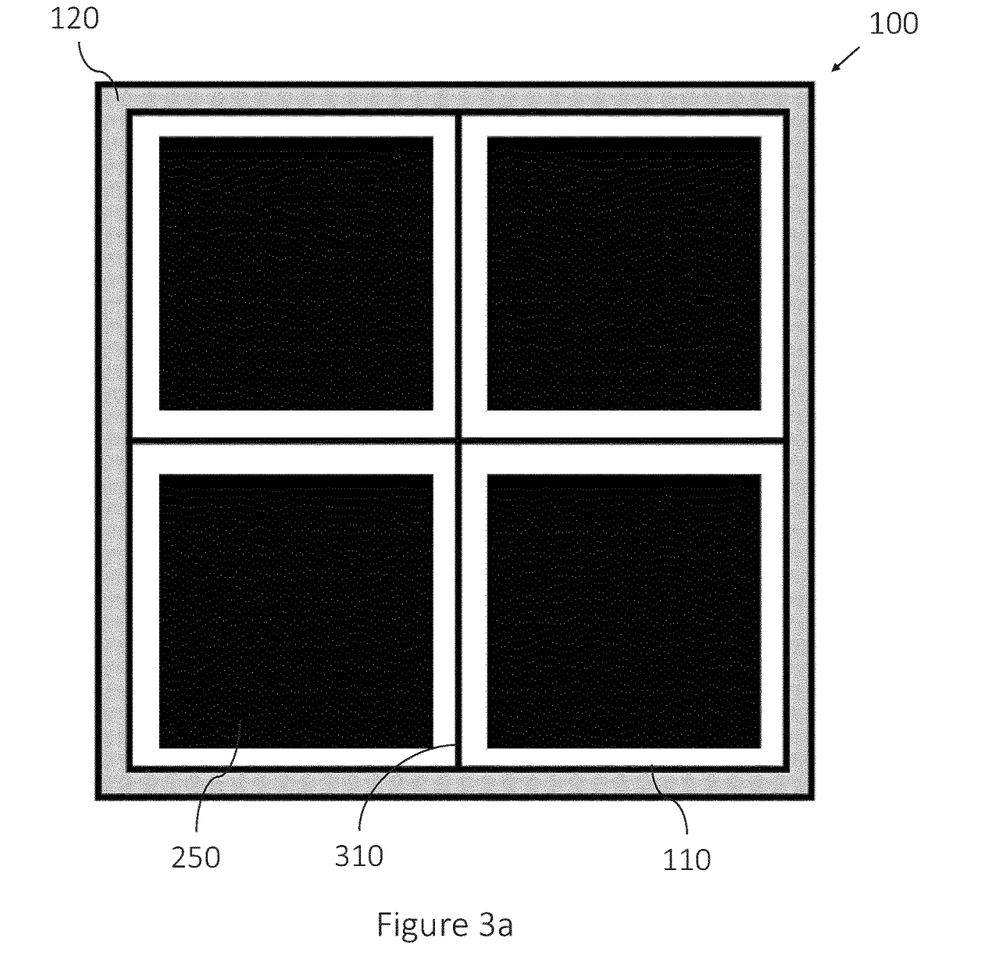
FIGS. 3a-b schematically illustrate example embodiments of radon dosimeters, in accordance with one or more embodiments described herein.
Figure 3B:
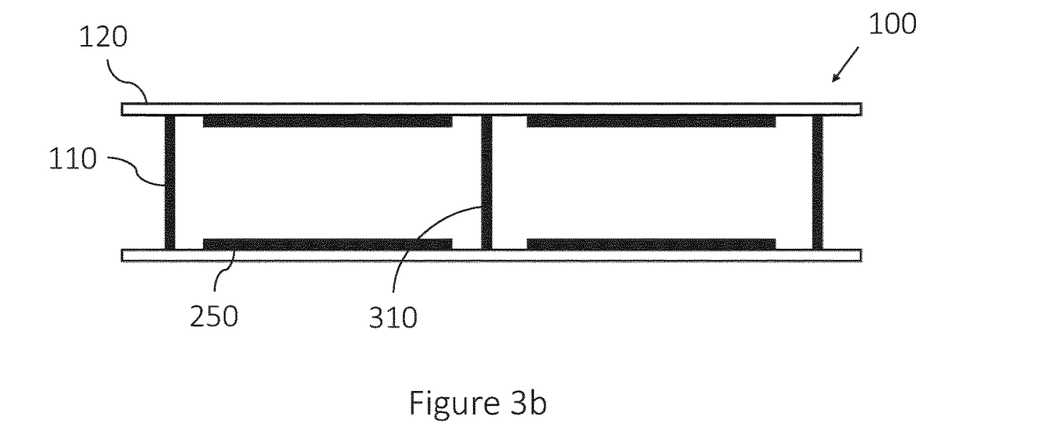

FIGS. 3*a*-*b* illustrate an embodiment where each detector 250 is surrounded by interior wall segments 310, which reach all the way to the circuit board 120, and thus create almost a separate diffusion chamber for each detector 250. In such an embodiment, it is not critical that the interior wall segments 310 are thin.

Figure 4A:
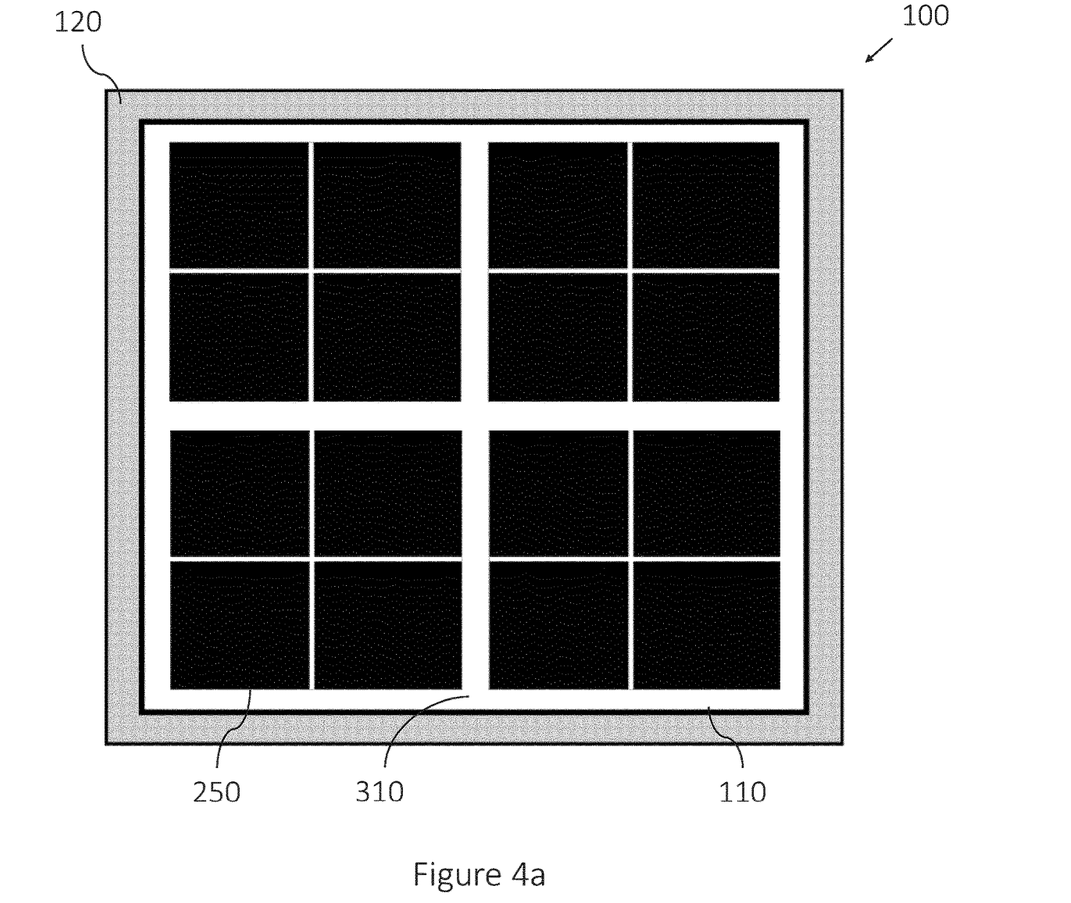
FIGS. 4a-b schematically illustrate example embodiments of radon dosimeters, in accordance with one or more embodiments described herein.
Figure 4B:
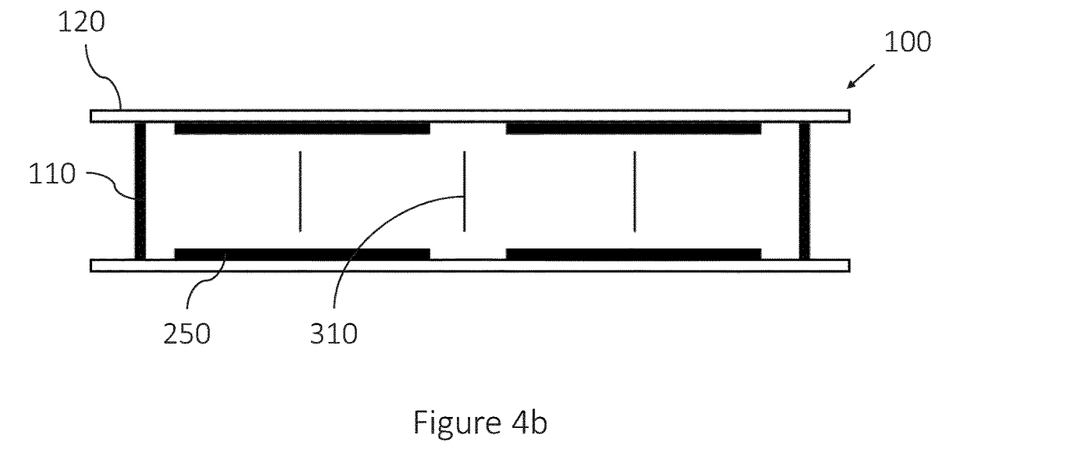

FIGS. 4*a*-*b* illustrate an embodiment where each detector 250 is divided into a number of sections, and each section is surrounded by interior wall segments 310. In such an embodiment, the interior wall segments 310 preferably do not reach all the way to the circuit board 120. Instead, there is preferably a gap of e.g. 1-2 mm between the interior wall segments 310 and the detector 250. In this embodiment, the interior wall segments 310 are preferably very thin.

The embodiments illustrated in FIGS. 3*a*-*b* and 4*a*-*b* are just illustrations—interior wall segments 310 may be arranged in any way that limits the number of alpha particles hitting a detector 250 after travelling a long distance (such as e.g. more than 20 mm, more than 15 mm, or more than 12 mm) sideways inside the diffusion chamber 130. An alpha particle from a secondary decay product that travels more than 20 mm before hitting a detector 250 is difficult to filter away using an energy window.

In prior art radon dosimeters, an electric field is often created in the diffusion chamber in order to draw the alpha particles towards the detector. Because of the short distance between the decay point and the detector, there is no need for any such electric field in the disclosed radon dosimeter 100. This reduces the power consumption of the disclosed radon dosimeter 100 (and also means that the measurements are not affected to any greater extent by the humidity). The power consumption may be further reduced by using low power components for the control electronics 220. This means that the disclosed radon dosimeter 100 may be powered for a long time by a battery included in the radon dosimeter 100.

The radon dosimeter 100 may be a stand-alone device, or a device that cooperates with another unit. If the radon dosimeter 100 is a stand-alone device, it preferably comprises a display, on which e.g. the current radon concentration and/or the total radon exposure is displayed. If the radon dosimeter 100 cooperates with another unit, it may use display means in the other unit to display e.g. the current radon concentration and/or the total radon exposure. The radon dosimeter 100 may also, or alternatively, use processing means in the other unit for analyzing and processing of the energy spectrum of the alpha particles in order to determine the radon concentration. The communication with the other unit may be in the form of physical communication, using physical communication means 230 such as e.g. a connector or a cord, or in the form of wireless communication. The other unit may e.g. be a dosimeter for one or more other types of radiation, so that the radon dosimeter 100 together with the other unit forms a combined dosimeter for radon and one or more other types of radiation.

The radon dosimeter 100 may comprise means for alerting the user when radon concentration beyond a predetermined limit has been determined. Since the radon dosimeter 100 actually determines real time radon concentration, it is possible to alert the user if the radon concentration in the air becomes dangerously high. This makes it possible to alert a user if the real time radon concentration increases beyond a predetermined threshold, such as e.g. 500 Bq/m³. The radon dosimeter 100 may comprise means for emitting e.g. light and/or sound and/or vibration in order to alert the user. However, it may also be arranged to signal another unit to alert the user using e.g. light and/or sound and/or vibration.

Figure 7:
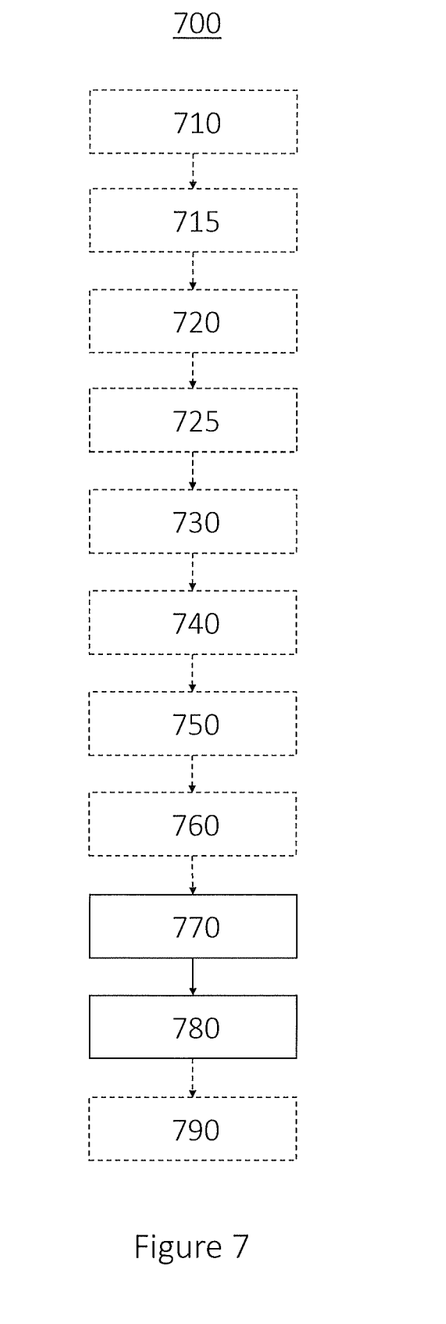
FIG. 7 schematically illustrates a method for determining radon concentration, in accordance with one or more embodiments described herein.

FIG. 7 schematically illustrates a method 700 for determining radon concentration using a device 100 comprising a diffusion chamber 130 that comprises a number of openings 210 that allow radon gas to enter and exit, and a radon sensing arrangement 150 comprising one or more detectors 250 that are arranged inside the diffusion chamber 130 in such a way that no part of the diffusion chamber 130 is located at a distance, perpendicular to the detector 250, of more than 20 mm from the closest part of a detector 250. A height of 20 mm is the upper limit for achieving that at least 50% of the detected alpha particles are emitted from direct decay of radon gas, even if subtraction of contributions from decay of $^{214}$Po is implemented, as explained above.

The method 700 may comprise:

Step 770: determining the energy content of alpha particles detected by the one or more detectors 250.

Step 780: determining the radon concentration by analyzing and processing the energy spectrum of these alpha particles.

This enables actual real-time determination of the radon concentration, by designing the device for optimizing the detection of direct radon gas decay.

The method 700 may further comprise one or more of:

Step 710: arranging the one or more detectors 250 as semiconductor detectors, such as e.g. diode arrays.

Step 715: arranging interior wall segments 310 inside the diffusion chamber 130, in order to limit the number of alpha particles hitting a detector 250 after travelling a long distance (such as e.g. more than 20 mm, more than 15 mm, or more than 12 mm) sideways inside the diffusion chamber 130. This makes it easier to accurately remove the effects of secondary radon decay products such as e.g. $^{214}$Po.

Step 720: preventing radon decay products from entering the diffusion chamber 130 by covering at least some of the openings 210 with a physical filter. This prevents such radon decay products from affecting the determination of the radon concentration.

Step 725: preventing moisture from entering the diffusion chamber 130 by using a moisture shield. This protects the contents of the diffusion chamber from being affected by such moisture.

Step 730: recording a time stamp for each detected alpha particle. This enables a better analyzing and processing of the energy spectrum.

Step 740: subtracting the contribution to the energy spectrum from decays taking place on surfaces that are not detectors 250, before determining the radon concentration. Recorded time stamps for the detected alpha particles may be used to improve such a subtraction.

Step 750: filtering away the contribution from alpha particles from decay of secondary radon decay products, by using an energy window, in the form of an upper and a lower energy threshold, before determining the radon concentration (the term "secondary radon decay product" in this disclosure refers to all decay products from all decays after the primary radon decay, and thus includes also $^{214}$Po). This increases the accuracy of the determination of the radon concentration.

Step 760: including detected decays from both radon gas and its primary decay product in the determination of radon concentration. This increases the accuracy of the determination of the radon concentration.

Step 790: alerting the user when radon concentration beyond a predetermined threshold has been detected.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. The disclosure describes a number of different embodiments, but further embodiments are of course also covered by the scope of the claims. For example, the device has been described as a radon dosimeter, but the scope of the claims cover any type of device that is suitable for determining radon concentration. The openings have been illustrated in the form of holes, but they may be just properties of the material, in case a radon gas permeable material is used for enclosing the diffusion chamber. Further, the steps may be carried out in any order that makes technical sense, and some steps may be carried out simultaneously. Accordingly, the scope of the invention is defined only by the claims.

The invention claimed is:

1. A device for determining radon concentration comprising:
   a diffusion chamber having two opposing surfaces and that comprises a number of openings that allow radon gas to enter and exit; and
   a radon sensing arrangement comprising:
      two or more detectors, arranged inside the diffusion chamber with at least one detector of the two or more detectors on each of the opposing surfaces in such a way that no part of the diffusion chamber is located at a distance, perpendicular to a detector, of more than 20 mm from the closest part of a detector; and
      at least one processing device,
   wherein the at least one processing device is arranged to determine the radon concentration by analyzing and processing the energy spectrum of alpha particles detected by the two or more detectors.

2. The device according to claim 1, wherein the diffusion chamber is an enclosed volume that is created by a frame, in the shape of four side walls, and two lids, arranged on either side of the frame, and wherein at least one detector of the two or more detectors is arranged on one lid and another detector the two or more detectors is arranged on the other lid.

3. The device according to claim 2, wherein the perpendicular distance between the lids is less than 20 mm.

4. The device according to claim 1, wherein the detectors are semiconductor detectors.

5. The device according to claim 1, wherein interior wall segments are arranged inside the diffusion chamber, in order to limit the number of alpha particles hitting a detector after travelling a long distance sideways inside the diffusion chamber.

6. The device according to claim 1, wherein the device is a radon dosimeter.

7. The device according to claim 1, wherein at least some of the openings are covered with a physical filter that prevents radon decay products from entering the diffusion chamber.

8. The device according to claim 1, further comprising a moisture shield that prevents moisture from entering the diffusion chamber.

9. The device according to claim 1, further comprising means for alerting a user when radon concentration beyond a predetermined threshold has been detected.

10. The device according to claim 1, wherein the at least one processing device is arranged to record a time stamp for each detected alpha particle.

11. The device according to claim 1, wherein the at least one processing device is arranged to subtract the contribution to the energy spectrum from decays taking place on surfaces that are not detectors, before determining the radon concentration.

12. The device according to claim 1, wherein the at least one processing device is arranged to use an energy window, in the form of an upper and a lower energy threshold, to filter away the contribution from alpha particles from decay of secondary radon decay products, before determining the radon concentration.

13. The device according to claim 1, wherein the at least one processing device is arranged to include detected decays from both radon gas and its primary decay product in the determination of radon concentration.

14. A method for determining radon concentration using a device comprising a diffusion chamber having two opposing surfaces and that comprises a number of openings that allow radon gas to enter and exit, and a radon sensing arrangement comprising two or more detectors that are arranged inside the diffusion chamber with at least one detector of the two or more detectors on each of the opposing surfaces in such a way that no part of the diffusion chamber is located at a distance, perpendicular to a detector, of more than 20 mm from the closest part of a detector, the method comprising:
   determining the energy content of alpha particles detected by the two or more detectors; and
   determining the radon concentration by analyzing and processing the energy spectrum of said alpha particles.

15. The method according to claim 14, further comprising recording a time stamp for each detected alpha particle.

16. The method according to claim 14, further comprising subtracting the contribution to the energy spectrum from decays taking place on surfaces that are not detectors, before determining the radon concentration.

17. The method according to claim 14, further comprising filtering away the contribution from alpha particles from decay of secondary radon decay products, by using an energy window, in the form of an upper and a lower energy threshold, before determining the radon concentration.

18. The method according to claim 14, further comprising including detected decays from both radon gas and its primary decay product in the determination of radon concentration.

19. The method according to claim 14, further comprising alerting a user when radon concentration beyond a predetermined threshold has been detected.

20. The method according to claim 14, further comprising preventing radon decay products from entering the diffusion chamber by covering at least some of the openings with a physical filter.

21. The method according to claim 14, further comprising preventing moisture from entering the diffusion chamber by using a moisture shield.

22. The method according to claim 14, further comprising arranging the two or more detectors as semiconductor detectors.

23. The method according to claim 14, further comprising arranging interior wall segments inside the diffusion chamber, in order to limit the number of alpha particles hitting a detector after travelling a long distance sideways inside the diffusion chamber.

24. A device for determining radon concentration comprising:
   a diffusion chamber that comprises a number of openings that allow radon gas to enter and exit; and
   a radon sensing arrangement comprising:
      one or more detectors, arranged inside the diffusion chamber in such a way that no part of the diffusion chamber is located at a distance, perpendicular to the detector, of more than 20 mm from the closest part of a detector; and
      at least one processing device,
   wherein the at least one processing device is configured to determine the radon concentration by analyzing and processing the energy spectrum of alpha particles detected by the one or more detectors, and
   wherein the at least one processing device is configured to filter away the contribution from alpha particles from decay of secondary radon decay products, before determining the radon concentration, by using time stamps recorded to each detected alpha particle and/or an energy window, in the form of an upper and a lower energy threshold.

* * * * *